(12) United States Patent
Arthur

(10) Patent No.: US 7,604,240 B2
(45) Date of Patent: Oct. 20, 2009

(54) CAPILLARY SEAL FOR A BURN CHAMBER

(75) Inventor: Alan R. Arthur, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1475 days.

(21) Appl. No.: 10/245,406

(22) Filed: Sep. 16, 2002

(65) Prior Publication Data

US 2004/0053103 A1  Mar. 18, 2004

(51) Int. Cl.
*E04B 1/682* (2006.01)
*F23G 7/08* (2006.01)
*H01J 17/18* (2006.01)

(52) U.S. Cl. .................. 277/316; 431/202; 313/623

(58) Field of Classification Search ............... 277/316; 431/202; 313/623, 624, 625, 634, 636
See application file for complete search history.

(56) References Cited

U.S. PATENT DOCUMENTS

| | | | |
|---|---|---|---|
| 2,223,031 A * | 11/1940 | Edwards | ............ 53/405 |
| 3,857,679 A | 12/1974 | Allred | |
| 4,596,700 A | 6/1986 | Tada et al. | |
| 4,704,257 A | 11/1987 | Tomizawa et al. | |
| 4,708,431 A * | 11/1987 | Pikulski et al. | ........ 385/138 |
| 4,720,994 A * | 1/1988 | Kessels et al. | .......... 73/49.3 |
| 4,873,062 A | 10/1989 | Kotani et al. | |
| 5,208,509 A * | 5/1993 | Snellgrove et al. | ....... 313/623 |
| 5,446,341 A * | 8/1995 | Hofmann et al. | ........ 313/623 |
| 5,455,480 A * | 10/1995 | Bastian et al. | ......... 313/285 |
| 5,810,635 A * | 9/1998 | Heider et al. | ............. 445/26 |
| 5,890,375 A * | 4/1999 | Ståhl et al. | ............... 62/511 |
| 5,891,405 A | 4/1999 | Bianchi et al. | |
| 6,016,383 A * | 1/2000 | Gronet et al. | .......... 392/416 |
| 6,434,327 B1 * | 8/2002 | Gronet et al. | .......... 392/416 |
| 6,486,054 B1 * | 11/2002 | Fan et al. | ............... 438/613 |

FOREIGN PATENT DOCUMENTS

DE    1227295    10/1966

* cited by examiner

*Primary Examiner*—Vishal Patel

(57) ABSTRACT

A heat-tolerant capillary seal for a burn chamber preferably includes a pass-through in an outlet of the burn chamber and an adhesion material in a gap between the pass-through and the interior of the outlet.

19 Claims, 4 Drawing Sheets

CAPILLARY SEAL FOR A BURN CHAMBER

FIELD OF THE INVENTION

The present invention relates to a heat-tolerant capillary seal. More particularly, the present invention provides a method for implementing a capillary seal for a burn chamber.

BACKGROUND OF THE INVENTION

Over the past century the demand for energy has grown exponentially following technological advances. With the growing demand for energy, many different energy sources have been explored and developed. One of the primary sources of energy has been, and continues to be, the combustion of hydrocarbons. However, the combustion of hydrocarbons is usually incomplete combustion that releases both non-combustibles that contribute to smog and other pollutants in varying amounts.

As a result of the pollutants created by the combustion of hydrocarbons, the desire for cleaner energy sources has increased in more recent years. With the increased interest in cleaner energy, alternative energy sources, such as fuel cells, have become more popular and more sophisticated. Research and development of these alternative energy sources has continued to the point that many speculate they will soon compete with the gas turbine for generating large amounts of electricity for cities, the internal combustion engine for powering automobiles, and batteries that run a variety of large and small electronic devices.

In many cases these alternative energy sources operate by conducting an electrochemical reaction that produces electricity and heat. Some of these alternative energy sources are capable of supplying power on a commercial level. However, commercial level, alternative energy sources frequently require high operating temperatures and are housed in large, stationary power plants. Temperature ranges often reach up to 1000 degrees ° C. in such stationary commercial units.

Due to the high temperatures involved, these energy production units are usually housed within a burn chamber to contain the excessive temperatures generated or required for operation. As used herein and in the appended claims, the term "burn chamber" refers to any containment device or structure used to house the power generating components of an energy source.

One of the main disadvantages of a high temperature system is that high operating temperatures require a specialized, sealed outlet between the burn chamber interior and exterior for transferring the power generated out of the burn chamber. Forming the seal on the outlet to the burn chamber has traditionally involved trying to find heat-resistant materials for the seal and the burn chamber that have very close coefficients of thermal expansion (CTE). This allows the burn chamber and seal to have matched expansion under any given conditions and thereby reduces the stress on the seal that develops during high-temperature operation.

In many cases, it is difficult to match the CTE of the non-conductive seal elements with the CTE of the typically conductive burn chamber. Attempting to obtain nearly identical matching of the CTE's may overly restrict the list of materials available for each application. Where materials with similar CTE's can be found, the materials are frequently excessively expensive or, despite the matching CTE's, may have other undesirable characteristics.

One particularly good example of a high temperature, alternative energy source that used a sealed outlet to a burn chamber is a solid oxide fuel cell (SOFC). The temperature required in the burn chamber of a SOFC typically reaches 600° C. or higher. At such high temperatures there is a need for a specialized outlet to house the power conductor from the fuel cell while concurrently preventing the escape of the reactants within the fuel cell.

SUMMARY OF THE INVENTION

In one of many possible embodiments, the present invention provides a heat-tolerant capillary seal for a burn chamber that preferably includes a pass-through in an outlet of the burn chamber and an adhesion material in a gap between the pass-through and the interior of the outlet.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF EMBODIMENTS OF THE INVENTION

Figure 1:
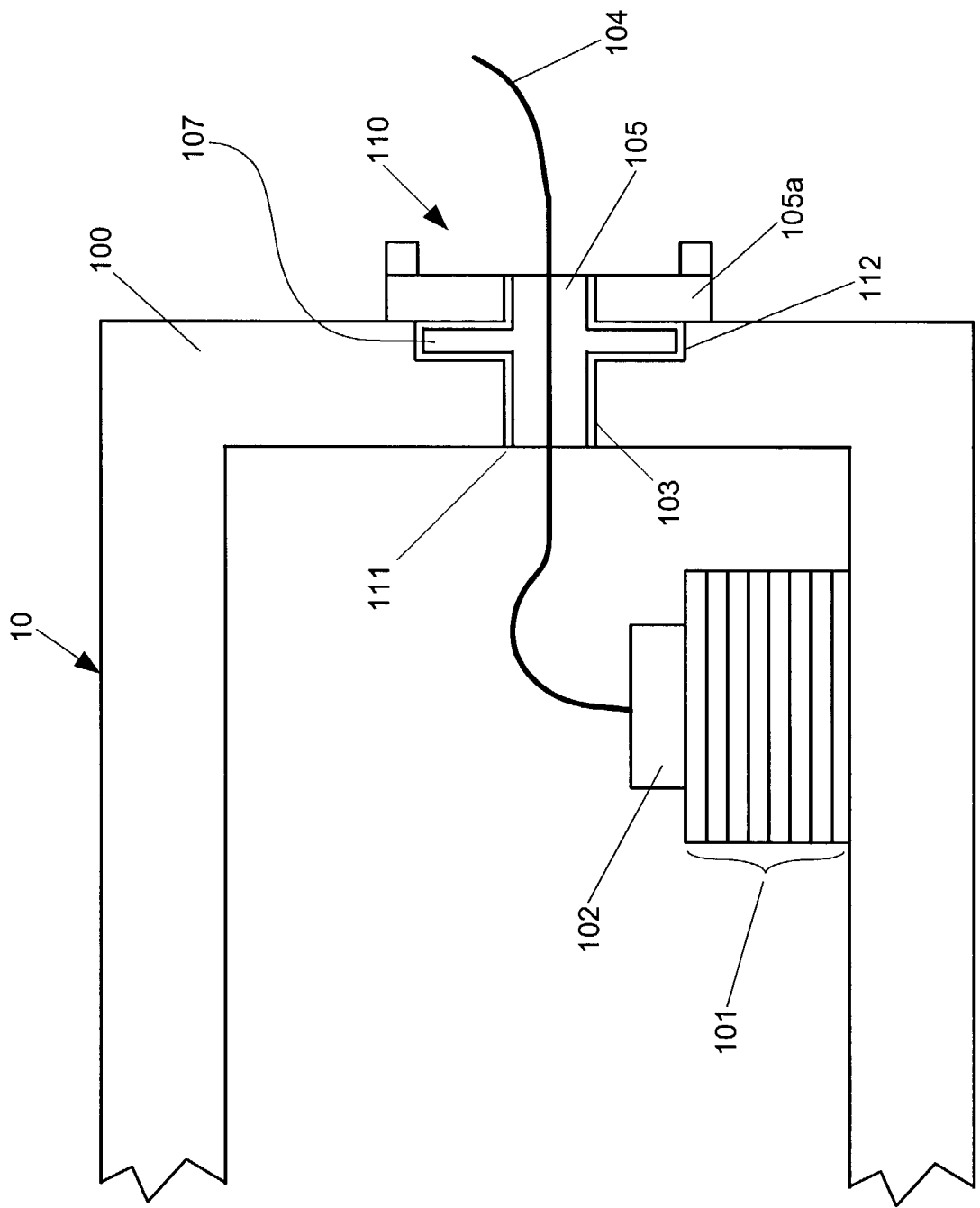
FIG. 1 is a cut-away view of a fuel cell burn chamber according to one embodiment of the present invention.

Illustrative embodiments of the invention are described below. The present invention is particularly useful for fuel cell applications. Therefore, the included embodiments are described in connection with a fuel cell. However, as will be appreciated by those skilled in the art, the present invention can be implemented in a wide variety of high temperature applications where a seal is needed between a high-temperature operating environment and a cooler exterior environment.

As used herein and in the appended claims, a "capillary seal" is defined as the separation of two or more environments or chambers, typically at different pressures, using the wetting and surface tension properties of a liquid to establish a seal between the environments that would otherwise equalize. In the case of a fuel cell, a capillary seal prevents the gases and heat necessary for the power producing reaction from escaping from the interior of a given reaction chamber The fuel cell applications of the present invention include, but are not limited to, solid oxide fuel cells (SOFC), alkali fuel cells (AFC), phosphoric acid fuel cells (PAFC), and molten carbonate fuel cells (MCFC). The present invention is particularly applicable to a SOFC. Therefore, the example of a SOFC is used herein to better describe a few of many possible embodiments of the present invention. An overview of a standard SOFC is provided preparatory to a description of the present invention.

An SOFC uses a hard ceramic electrolyte and typically operates at temperatures up to about 1,000 degrees C. (about 1,800 degrees F.). The electrolyte is a specially treated high density non-porous material that conducts only negatively charged ions.

A mixture of zirconium oxide and Yttrium oxide is typically used to form a crystal lattice that becomes the high density non-porous electrolyte. Other oxide combinations have also been used as electrolytes. The solid electrolyte is coated on both sides with specialized porous electrode materials. The specialized porous materials act as a catalyst to facilitate an energy-producing reaction between oxygen and various fuels.

The electrolyte is incorporated into an anode of the fuel cell. The anode is the negative post of the fuel cell. At a high operating temperature, oxygen ions (with a negative charge) migrate through the crystal lattice. When a fuel containing hydrogen (usually propane or butane) is passed over the anode, a flow of negatively charged oxygen ions moves across the electrolyte to oxidize the fuel. As fuel molecules are oxidized, electrons are freed that are conducted by the anode as a current that can be used in an external circuit. To operate most effectively, the anode needs to be able to disperse the fuel gas as evenly as possible over the surface of the catalyst.

The oxygen is supplied, usually from air, at the cathode. The cathode is the positive post of the fuel cell and similarly, is designed to evenly distribute oxygen (usually air) to the surface of a catalyst.

Electrons generated at the anode travel through an external load to the cathode, completing the circuit and supplying electric power along the way. Power generation efficiencies of SOFC's can range up to about 60 percent.

In one configuration, the SOFC consists of an array of tubes. Another variation includes a more conventional stack of disks.

Turning now to the figures, and in particular to FIG. 1, an illustration of a SOFC reactor (10) is shown. The reactor (10) includes and is housed within a burn chamber (100). As previously mentioned, the burn chamber (100) is preferably designed to contain gases, and other reactive elements used by the SOFC to generate power. The burn chamber (100) of an SOFC is commonly constructed using metal or ceramic materials that are unaffected by temperatures ranging from 400 to 1000 C.

A seal (110) is needed between the interior of the burn chamber (100) and the exterior environment. The seal (110) between the interior of the burn chamber (100) and the exterior contains several elements. As used herein and in the appended claims, the term "outlet" (111) will refer to the opening through the burn chamber (100) wall in which the seal elements are disposed. As used herein, the term "seal" (110) will refer to the combination of elements that interface between the interior and exterior of the burn chamber (100) preventing heat and reactants inside the burn chamber (100) from escaping through the outlet (111).

The SOFC preferably includes a number of disks or tubes located within the burn chamber (100) in which the power-producing reaction of the fuel cell is conducted. In many cases the SOFC disks are stacked forming a fuel cell array or stack (101). The fuel cells are arranged in a stack (101) in order to easily distribute the fuel cell reactants and collect the output of each fuel cell. An electrical bus (102) is preferably arranged on or near the SOFC stack (101) allowing the power produced in the individual disks or tubes of the fuel cell stack (101) to be collected. The output from each disk or tube within the fuel cell is connected to the electrical bus (102). The power generated in the stack (101) is then transferred out of the burn chamber (100), preferably on a single conductor (104), connected to the electrical bus (102).

The conductor (104) may be any conductive material that allows the current produced by the fuel cell stack (101) to be transferred out of the burn chamber (100) through the seal (110). In some embodiments, this conductor (104) will simply be a wire or cable and will accordingly be referred to as a "wire" hereafter. As stated above, the wire (104) connects to the electrical bus (102) and is preferably sufficient to carry all of the power generated by the fuel cell stack (101). The wire (104) runs from the SOFC stack (101) through the seal (110) to the exterior of the burn chamber (100). Outside the SOFC (10), the wire (104) may be connected to a load, e.g., a device requiring electrical power. The wire (104) thus provides power from the fuel cell (10) to that load.

The wire (104) passes between the interior and exterior of the seal (110) by means of a non-conductive pass-through (105) which is part of the seal (110). The pass-through (105) is preferably constructed using a non-conductive material to prevent the wire (100) from shorting with the material of the burn chamber (100) or the SOFC stack (101) which is typically conductive. The pass-through (105) may be made from any heat-tolerant non-conductive material but is preferably a ceramic material able to withstand the high temperatures of the burn chamber (100) and the power transfer wire (104).

The pass-through (105) may have a stop or retention shoulder (107) that functions to seat the pass-through (105) in the outlet (111) of the burn chamber (100). As shown in FIG. 1, the outlet (111) preferably includes an annular groove (112) on the exterior of the burn chamber (100) to receive the retention shoulder (107). The retention shoulder may be a separate element used in combination with the pass-through (105) or may be formed as an integral part of the pass-through (105). The retention shoulder (107) is preferably held in the groove (112) with a retaining cap (105a). The retention shoulder (107) may also secure the pass-through (105) during the expansion and contraction process of the SOFC reactor (10) elements as the SOFC stack (101) heats and cools.

The burn chamber (100) wall and the pass-through (105) are preferably sized such that there is a gap between the two in the outlet (111). The gap preferably allows elements in the seal (110) to expand according the CTE of each without causing mechanical stress or excessive gap size.

The gap is preferably filled with an expansive adhesion material (103). The adhesion material (103) may include a metal or metal alloy that may be used to liquidly seal the gap between the burn chamber (100) and the pass-through (105) as the temperature in the SOFC reactor (10) increases. The adhesion material (103) is used to maintain a capillary seal as previously described. A preferred adhesion material (103) in embodiments of the present invention is solder.

Solder (103) is generally a non-ferrous filler metal or metal alloy used to join two wettable (or solder compatible) base materials each of which commonly has a melting point above that of the solder (103). Such materials may include, but are not limited to, tin, lead, and various precious metals as well as alloys of these. Preferably, the solder (103) has a melting point lower than the operational temperature of the SOFC stack (101) or expected burn chamber (100) temperature, a high vapor pressure, and will be non-oxidizing.

As the temperature increases in the burn chamber (100) the gap filled with low melting point solder (103) will be heated causing the solder (103) to melt forming a liquid capillary seal between the burn chamber (100) wall and the pass-through (105). The melting temperature of the solder (103) allows the liquid capillary seal to conform as the elements within the seal undergo extensive expansion or contraction due to temperature changes within the SOFC reactor (10). The solder seal (103) allows the materials used in the burn chamber (100) and the seal (110) to have thermal expansion coefficients that are not identically matched. This allows for substantially more choices for the materials used while improving seal functionality.

The capillary seal formed by the solder (103) allows the varying pressures between the interior and exterior of the burn chamber (100) to be maintained by sealing the gap around the pass-through (105). The capillary seal may be most useful for low-pressure applications without disrupting the seal functionality.

If the differential pressure between the interior and exterior of the burn chamber (100) becomes excessive, it is likely that the solder (103) will be displaced and the seal (110) will be compromised or released.

It may still be important to elect materials for the burn chamber (100) and the pass-through (105) that have a substantially similar CTE. If the difference between the CTE's of the burn chamber (100) and pass-through (105) is too extreme the solder seal may not be adequate to maintain the desired seal. The expansion resulting from the SOFC start up may cause an excessive gap size resulting in blow out of the solder (103).

The burn chamber (100) and the pass-through (105) preferably have highly wettable surfaces. As used herein "wettability" is the property of a material that describes the ability of a solder (103) or similar filler material to adhere to its surface. A highly wettable material allows solder (103) to securely and easily adhere to its surface.

On many materials that require high wettability a seed layer is used. A seed layer is a thin deposition of a material that is high wettable. This allows a material or element with a low wettability to have high wettability properties on portions that have the deposited seed layer. The burn chamber (100) and the pass-through (105) preferably have a seed layer deposited on the portion of each surface exposed to the gap and solder (103) increasing the wettability of each such surface.

During start up and during the time that the fuel cell is running, the temperature within the burn chamber (100) will increase significantly. The increase in temperature may be sufficiently high such that the elements shown in FIG. 1 expand significantly.

The amount that each element expands is specific to each component and the material(s) from which it is constructed. It is important to note that thermal expansion occurs in all dimensions and therefore the aforementioned gap and solder (103) can effectively reduce mechanical stress and prevent blow out of the seal without the level of CTE matching that has been required in the past. Using the solder-filled gap (103) allows the materials used in the seal (110) to expand and contract with minimal mechanical stress due to the low yield point of the solder material as compared to burn chamber and pass through (105) material yield points.

There are many variables that affect the amount of pressure that the burn chamber (100) may withstand before the capillary seal is compromised and the solder (103) is bypassed as the pressure equalizes. Some variables affecting possible sustainable burn chamber (100) pressures include: pass-through (105) radius, temperature, gap width, surface tension of the solder (103), wettability of the surfaces, contact angle of the wetting surface with the solder (103), and various other factors. It is important to note that the type of solder (103) necessary to insure a proper seal within the burn chamber (100) and outlet will be chosen according to the aforementioned variables, individual application, and pressure needs.

When the SOFC reaction is halted, the sealing process will preferably reverse itself. As the elements begin to cool and contract, the solder (103) remains a liquid and continues to conform to the shape of the gap until the solidification temperature of the solder is reached. As the solder (103) solidifies, it seals the gap between the pass-through (105) and the burn chamber (100) with hardened solder. This cooling and reverse sealing process continues until the SOFC reactor (10) reaches an ambient or stand-by temperature.

Figure 2:
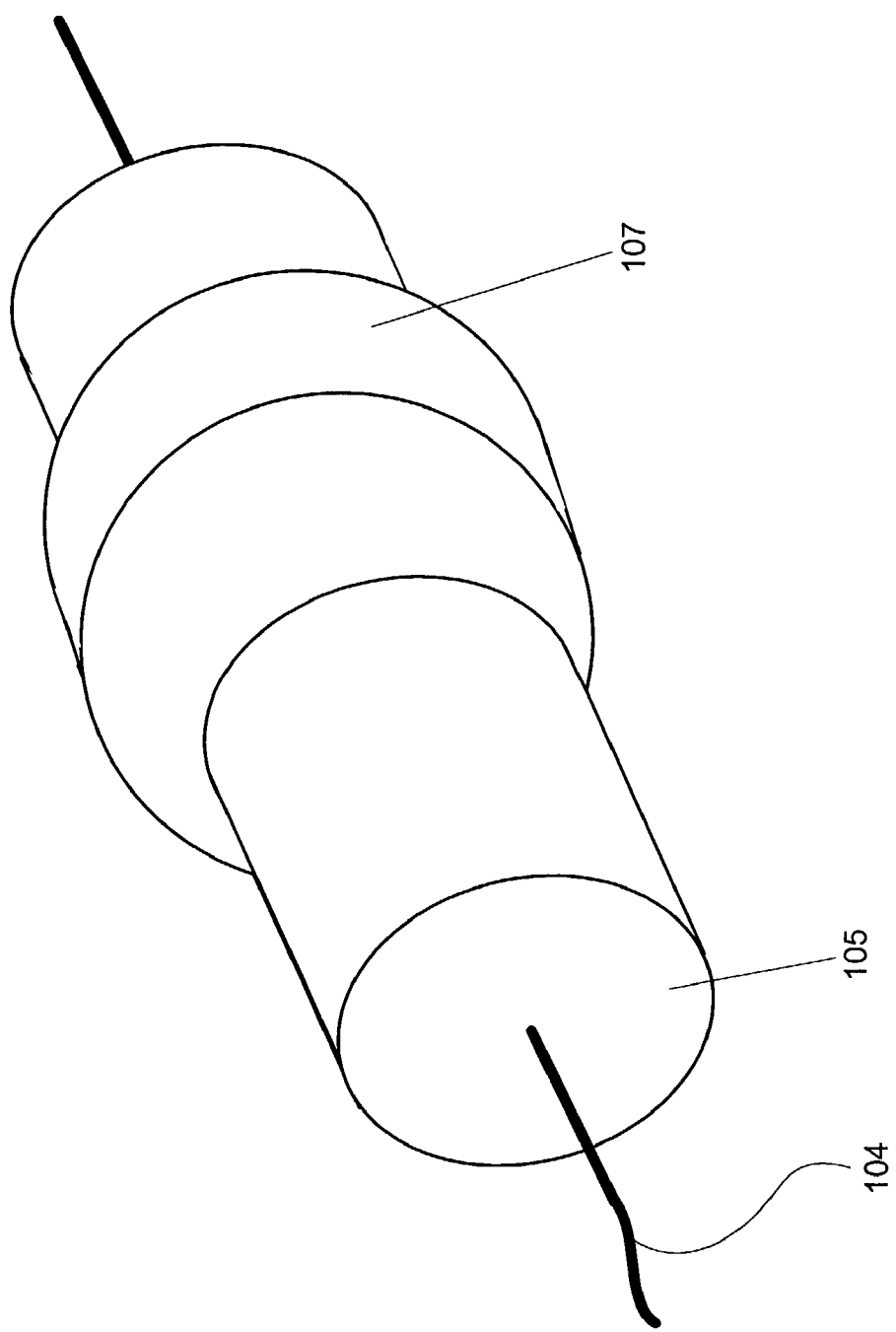
FIG. 2 is a perspective view of a pass-through for a capillary seal according to one embodiment of the present invention.

FIG. 2 illustrates a different view of the pass-through (105) interface of FIG. 1, including the retention shoulder (107) and power conduction wire (104). It is important to note that a retention shoulder (107) is not necessary for the proper operation of the pass-through (105). However, in the present embodiment the retention shoulder (107) can facilitate assembly and make the pass-through (105) more stable.

The wire (104) may be centered in the non-conductive pass-through (105). The non-conductive pass-through (105) prevents the wire (104) from shorting with the typically conductive burn chamber (not shown). The retention shoulder (107) illustrates one of many possible forms of retention for the pass-through (105). The pass-through shoulder (107) can prevent fluctuating temperatures from dislodging the pass-through (105) from the burn chamber (100) and provide mechanical limits for preventing excessive motion in the axial direction (parallel to the wire) of the pass-through (105) during expansion or other shock to the elements shown in FIG. 2. The burn chamber and retention cap provide the mechanical limits on opposing sides of the retention shoulder (107).

Figure 3:
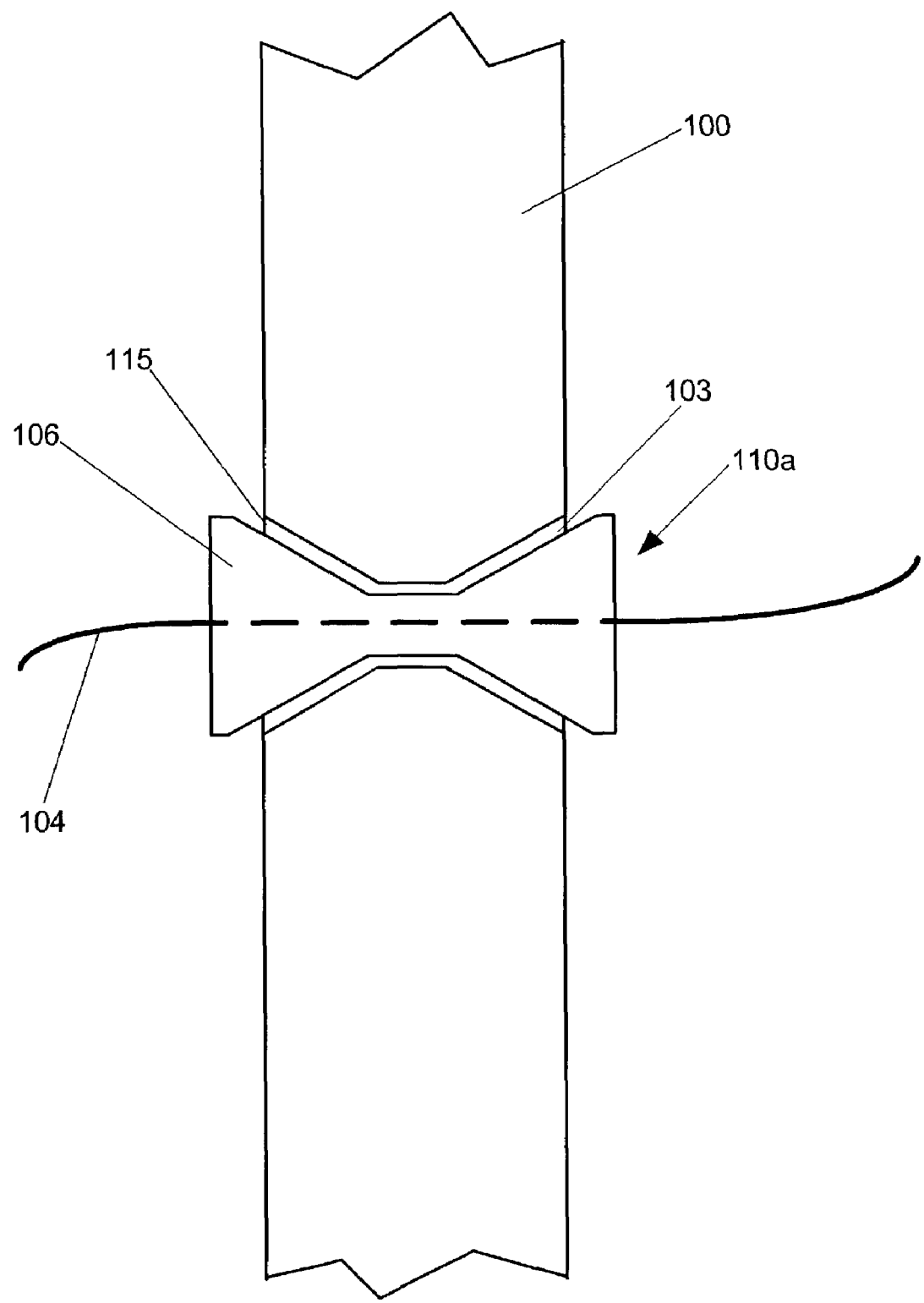
FIG. 3 a cut-away view of a capillary seal according to one embodiment of the present invention.

FIG. 3 shows a capillary seal according to another embodiment of the present invention. Specifically, FIG. 3 shows a cut-away view of a burn chamber (100) wall outlet and a seal (110a). The seal (110a) includes a pass-through (106) and an expansive adhesion material, e.g., solder (103), filling the gap between the pass-through (106) and the interior of an opening (115) in the burn chamber (100). In the present embodiment, the non-conductive pass-through is an hourglass shaped pass-through or self-retaining pass-through (106). The opening (115) in the burn chamber (100) that receives the pass-through (106) has a corresponding shape as shown in FIG. 3.

Due to the hourglass shape, the self-retaining pass-through (106) may eliminate the need for a shoulder on the pass-through as described above in the embodiment illustrated in FIG. 1. The burn chamber (100) outlet (115) through which the self-retaining pass-through (106) passes is reshaped to accommodate the self-retaining pass-through (106). As before, the gap between the pass-through (106) and the interior of the opening (115) is filled with solder (103) or like material.

As described above, high temperatures will result during fuel cell operation. Consequently, the self-retaining pass-through (106) and burn chamber (100) can expand in all directions. The shape of the self-retaining pass-through (106) and corresponding burn chamber opening (115) can reduce stress that would otherwise be caused by expansion in all directions of the pass-through (106) and burn chamber wall (100).

The shape of the self-retaining pass-through (106) can essentially perform the same function as the previously described pass-through retention shoulder by limiting the movement of the self-retaining pass-through (106) in the opening (115) despite expansion or other motion. As the elements shown in FIG. 3 expand the gap width between the pass-through (106) and the wall (100) will stay approximately constant. This is due to expansion of the pass-through (106) in an axial, as well as a radial direction.

Figure 4:
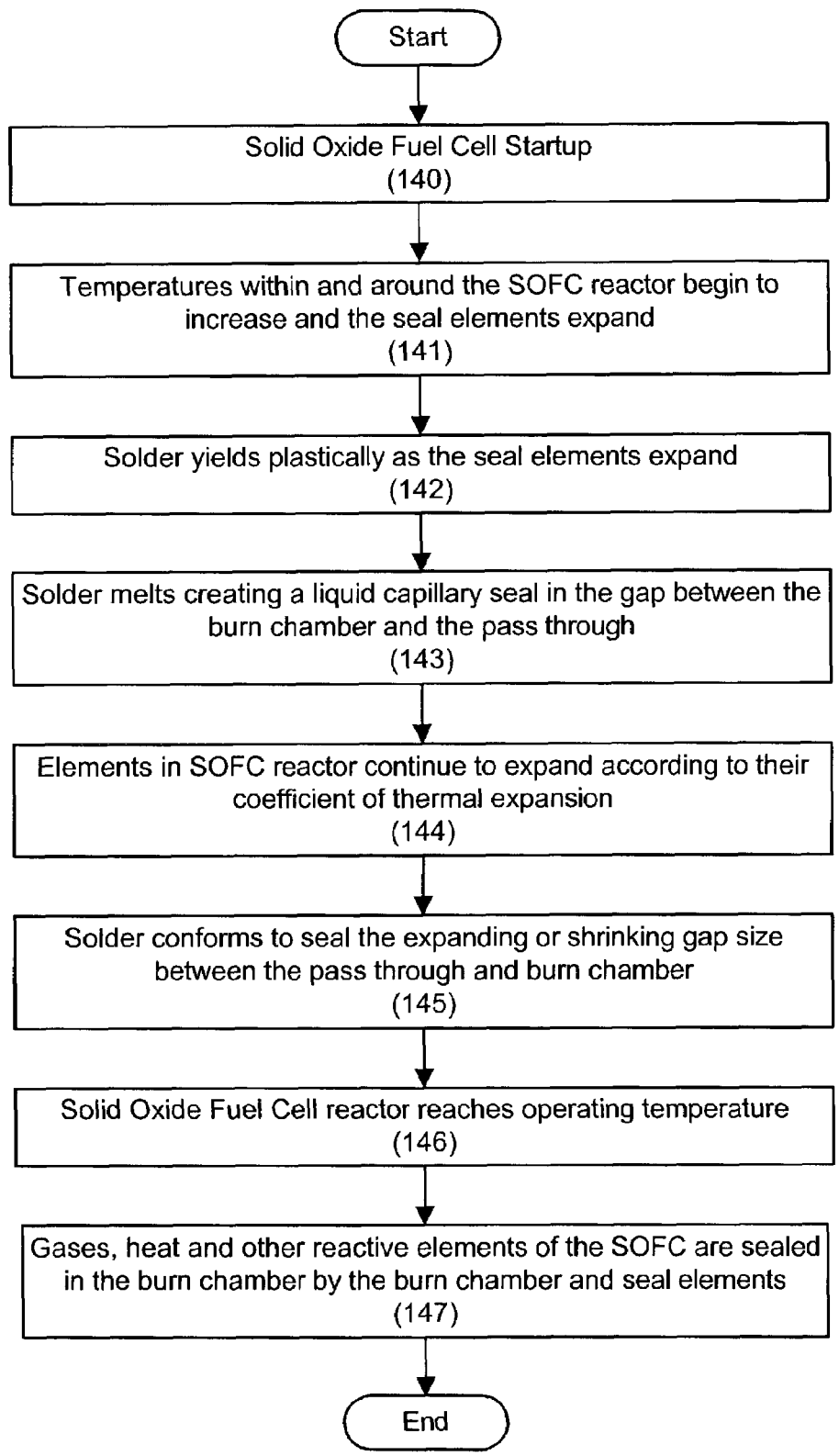
FIG. 4 is a flowchart illustrating the operation of the system illustrated in FIG. 1 according to an embodiment of the present invention.

FIG. 4 is a flow chart illustrating operation of the embodiments of the heat-tolerant capillary sealing system illustrated in FIG. 1 according to principles of the present invention. As shown in the example of FIG. 4, the process begins when the SOFC reactor is started (140). At this point, the required fuel is released within the burn chamber and the elements in and around the SOFC reactor begin to heat up (141) to reach the optimal power production temperature.

As the temperature increases (141), the solder would first yield plastically and then ultimately begin to melt in the gap between the pass-through and the burn chamber (142). At the melting point of the solder, the solder will liquefy adhering to the seeded surface of the pass-through and burn chamber to form a liquid capillary seal (143).

Preferably, the temperature continues to rise within the burn chamber to reach the ideal power generation temperature of the SOFC reactor. During the temperature rise, the elements in the SOFC reactor expand in accordance with their individual CTE (144). The elements in the burn chamber and outlet may or may not have similar CTE's. Preferably, the elements are somewhat matched so that the gap between the pass-through elements and the burn chamber wall does not become excessively large allowing blow by in the solder filled gap, or excessively small or non-existent causing the expulsion of the solder from the gap or worse creating mechanical stress between the elements.

In the case that the expansion is not excessive, the liquefied solder conforms to seal the expanding or contracting gap size between the pass-through and the burn chamber (145). Preferably the SOFC reactor reaches the operating temperature (146) without excessive expansion of the seal elements.

The capillary seal formed by the solder preferably prevents the escape of all heat, gases, and other reactive elements required in the burn chamber (147) for efficient SOFC power production. When the SOFC reactor is turned off, the process shown in FIG. 4 is preferably reversed, i.e., the SOFC reactor cools and the solder eventually solidifies sealing the gap between the burn chamber wall and the pass-through in the 'cool off' process.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best illustrate the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A heat-tolerant capillary seal for a burn chamber comprising:
    a pass-through received in an outlet of the burn chamber; and
    an adhesion material for use in a gap between said pass-through and an interior of the outlet, wherein said adhesion material liquefies from a solid form during operation of the burn chamber.

2. The heat-tolerant capillary seal of claim 1, wherein said pass-through is made of a non-conductive, ceramic material.

3. The heat-tolerant capillary seal of claim 1, wherein said pass-through has an hourglass shape.

4. The heat-tolerant capillary seal of claim 1, wherein said adhesion material is solder.

5. The heat-tolerant capillary seal of claim 4, further comprising a seed layer on said pass-through and in said outlet to facilitate adhesion of said solder within said gap.

6. The heat-tolerant capillary seal of claim 1, further comprising a retention cap for said non-conductive pass-through.

7. The heat-tolerant capillary seal of claim 4, wherein said solder has a lower melting point than an operational temperature of said burn chamber.

8. The heat-tolerant capillary seal of claim 1, further comprising a conductor extending through said pass-through for transferring power generated in said burn chamber to an exterior load.

9. The heat-tolerant capillary seal of claim 1, wherein said burn chamber and said pass-through have substantially similar coefficients of thermal expansion, such that during operation of said burn chamber, said outlet and said pass-through do not exert stress on each other.

10. The heat-tolerant capillary seal of claim 4, wherein said solder assumes a liquid form at a lower temperature than an operational temperature of said burn chamber.

11. The heat-tolerant capillary seal of claim 4, wherein said solder comprises any metal or alloy thereof that is non-oxidizing.

12. A heat-tolerant capillary seal for an outlet of a burn chamber, said seal comprising:
    interface means for passing a conductor between an interior and exterior of said burn chamber through said outlet; and
    sealing means for liquidly sealing a gap between said burn chamber and said interface means.

13. The seal of claim 12, further comprising means for securing said interface means in said outlet.

14. The seal of claim 12, wherein said interface means are non-conductive.

15. The seal of claim 12, wherein said sealing means comprise solder.

16. A method of using a heat-tolerant capillary seal to seal an outlet of a burn chamber, said method comprising:
    heating said burn chamber to melt an adhesive material disposed in a gap between said outlet of said burn chamber and a pass-through disposed in said outlet, said adhesive material, when melted, forming a capillary seal around said pass-through.

17. The method of claim 16, wherein said heating is performed by operating a fuel cell in said burn chamber.

18. The method of claim 16, further comprising transmitting power generated in said burn chamber through said pass-through.

19. The reactor of claim 16, wherein said pass-through has an hourglass shape.

* * * * *

UNITED STATES PATENT AND TRADEMARK OFFICE
CERTIFICATE OF CORRECTION

| | | |
|---|---|---|
| PATENT NO. | : 7,604,240 B2 | Page 1 of 1 |
| APPLICATION NO. | : 10/245406 | |
| DATED | : October 20, 2009 | |
| INVENTOR(S) | : Alan R. Arthur | |

It is certified that error appears in the above-identified patent and that said Letters Patent is hereby corrected as shown below:

In column 7, line 52, in Claim 1, delete "bum" and insert -- burn --, therefor.

In column 8, line 30, in Claim 12, delete "bum" and insert -- burn --, therefor.

Signed and Sealed this

Twelfth Day of January, 2010

David J. Kappos
*Director of the United States Patent and Trademark Office*